United States Patent [19]

Kammler et al.

[11] Patent Number: 4,674,581

[45] Date of Patent: Jun. 23, 1987

[54] DISTRIBUTING DEVICE FOR LOOSE MATERIAL, IN PARTICULAR FOR A COMBINATION SCALE

[75] Inventors: Roman Kammler, Worms; Walter Baur, Gruendau, both of Fed. Rep. of Germany

[73] Assignee: PME Pack-Matic Engineering GmbH, Lollar, Fed. Rep. of Germany

[21] Appl. No.: 850,752

[22] Filed: Apr. 11, 1986

[30] Foreign Application Priority Data

Apr. 15, 1985 [DE] Fed. Rep. of Germany ....... 3513398

[51] Int. Cl.$^4$ ............................................ G01G 19/22
[52] U.S. Cl. .................. 177/25; 177/DIG. 11
[58] Field of Search ........................ 177/25, DIG. 11

[56] References Cited

U.S. PATENT DOCUMENTS 4,421,185 12/1983 Koto et al. ............................ 177/25
4,596,327 6/1986 Yamano ............................ 177/25 X Primary Examiner—George H. Miller, Jr.
Attorney, Agent, or Firm—Flynn, Thiel, Boutell & Tanis

[57] ABSTRACT

A distributing container (2) has a base (9), which has openings (11 to 18). Inclined sliding surfaces (20, 19) start out from the edges (13a, 13b) of the openings (11 to 18), which sliding surfaces ease the movement of the loose material toward the openings (11 to 18). The fill level in the distributing container (2) is maintained constant with the help of a power-measuring device (29), from where the feeding of loose material into the distributing container (2) is regulated. Conveyors, for example conveyor troughs (3), are arranged below the openings (11 to 18), which forward the loose material which exists through the openings (11 to 18).

An especially constant feeding of the conveyor troughs (3) can be achieved with the help of the distributing container (2).

9 Claims, 4 Drawing Figures

DISTRIBUTING DEVICE FOR LOOSE MATERIAL, IN PARTICULAR FOR A COMBINATION SCALE

FIELD OF THE INVENTION

The invention relates to a distributing device for the distribution of loose material onto several conveyors, for example conveyor troughs, in particular for a combination scale.

BACKGROUND OF THE INVENTION

In a conventional distributing device of this type (German OS No. 34 09 806) there is provided a plate-shaped center unit which is coupled with a vibrating drive. The loose material falls onto this center unit and is from there distributed to several circularly arranged weighing units of a combination scale. The spaces between the vibrating conveyor troughs, which extend radially from the center unit, are covered by means of radial projections, which is supposed to prevent the loose material from falling into the spaces and the goods which moves in one conveyor trough from effecting the goods provided in the adjacent trough and thus an undesired conveying is avoided.

Also known is a distributing device (German OS No. 34 09 388), which has a distributing member, which has alternating radial ribs and valleys. The ribs are supposed to divide agglomerates of the product which is to be conveyed, before they reach outlet openings which lead to the various weighing units located at the periphery of the distributing device.

In both known distributing devices there exists the risk that the loose material falls unevenly onto the conveyor troughs, so that these are at times flooded and at times receive not enough loose material. The product flow depends strongly on the feeding of the loose material to the distributing device. The dosing of partial amounts through weighing containers of the combination scale occurs by supplying the loose material during a certain time span. Because of different conveyor flow rates in the conveyor troughs, it is often difficult to maintain the partial amount with the necessary exactness. Help cannot always be given, not even through a readjustment, since the significantly different flow rates would be adversely effected.

The basic purpose of the invention is to construct a distributing device of the abovementioned type such that the conveyors are supplied evenly with loose material.

The distributing device of the abovementioned type which has been created to attain this purpose is characterized by a distributing container having a base with openings, a conveyor arranged under each opening and device for maintaining constant the fill level in the distributing container.

The outflow of loose material through the openings is maintained constant in a so constructed distributing device, since the same pressure exists at each opening due to the maintaining constant of the fill level. An as much as possible exact filling of the individual partial amount weighing containers is achieved therewith also without readjustment.

In a preferred embodiment of the invention, upwardly diverging sliding surfaces follow the edges of the openings. The inclination of the sliding surfaces can be adjusted to the flow characteristics of the respective loose material in order to obtain an as much as possible favorable outflow of the loose material. With the help of the sliding surfaces is achieved an assured sliding of the material to be transported, even without a vibrator drive for the distributing container. Sliding surfaces, which are associated with adjacent openings, join advantageously at a crest. The base of the container is then so to speak formed by several such surfaces. The openings increase preferably in flow direction of the loose material, which further improves the even feeding of the conveyors.

The device for maintaining constant the fill level has preferably a scale. Loose material is added when falling below a certain weight. If a pregiven weight is reached, the further feeding of loose material is stopped. The fill level can, however, also be maintained constant in a different manner, in particular by an optical scanning of the surface of the loose material in the distributing container and regulating the supply corresponding with the result of the scanning.

The distributing device can have both a circular distributing container and also a rectilinear distributing container, which for example, viewed in the top view, is constructed rectangularly. The openings can be of a different size, so that conveyors with different performance can be supplied.

BRIEF DESCRIPTION OF THE DRAWINGS

Exemplary embodiments of the invention are illustrated in the drawings, in which.

DETAILED DESCRIPTION

Figure 2:
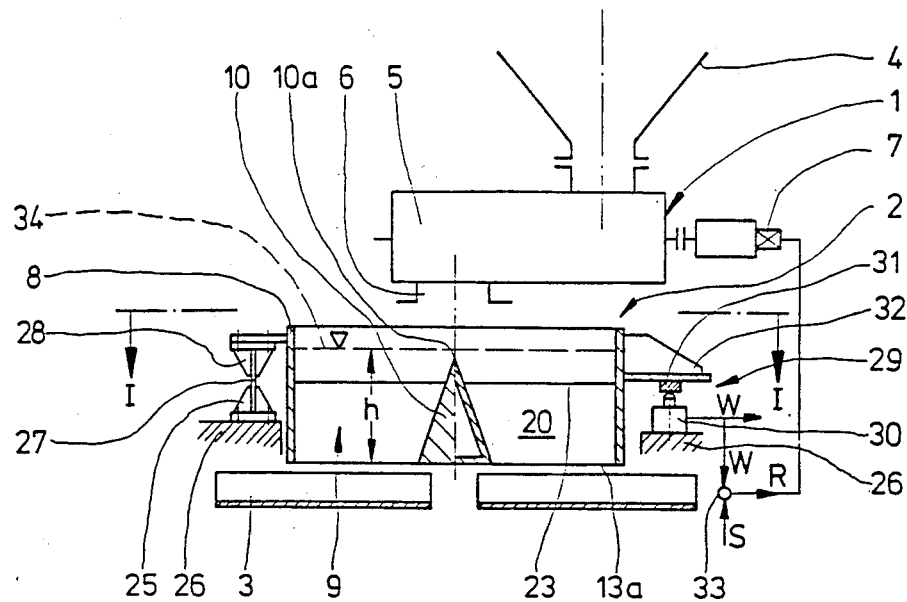
FIG. 2 is a vertical cross-sectional view of the distributing device according to FIG. 1 corresponding with the line II—II of FIG. 1.
Figure 1:
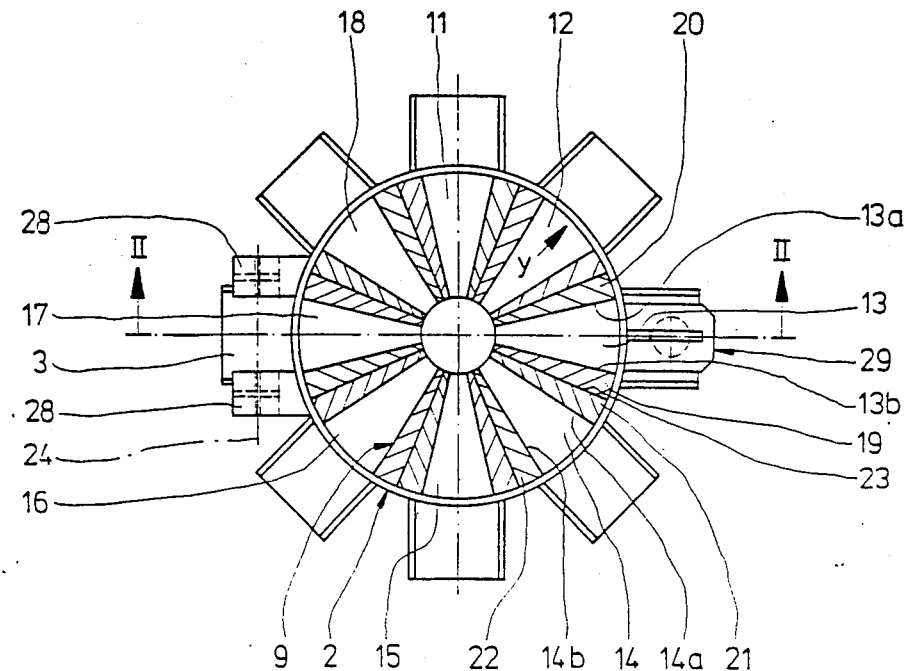
FIG. 1 is a top view of a distributing device which is constructed circularly corresponding with the arrows I—I of FIG. 2.

The distributing device according to FIGS. 1 and 2 has a loose material feed mechanism 1, a distributing container 2 which is arranged under the feed mechanism and several conveyor troughs 3 which are arranged under the distributing container.

The feed mechanism 1 consists of a funnel-shaped container 4, which is closed off below by means of a conveyor apparatus 5 and is driven by means of a steplessly adjustable drive motor 7 (or an actuating mechanism) (FIG. 2), and of an outlet pipe 6, the axis of which is arranged above the axis of the center body 10.

The feed mechanism 1 can also consist of a funnel-shaped container 4' (FIG. 4), which is closed off at the lower end by means of a hinged plate 6'. The hinged plate 6' is pivotal about an axle 6'a by a means of a drive motor 7'. The closed position is illustrated. Upon pivoting of the hinged plate 6' about the axle 6'a counterclockwise direction, the outlet opening of the container 4' is opened.

The distributing container 2 has a cylindrical wall 8 and a base which is identified as a whole by the reference numeral 9. In the center of the base there is provided a pyramid-shaped or conical center body 10, which is tapered downwardly. A total of eight openings 11 to 18 are in the base. The openings are approximately segment-shaped and can have different widths. From each edge of each opening rises an inclined sliding surface. This shall be viewed in connection with the example of the openings 13 and 14. The opening 13 has lateral edges 13a and 13b and the opening 14 has lateral edges 14a and 14b. From the edge 13b rises a sliding surface 19 and from the edge 13a a sliding surface 20. From the edge 14a rises a sliding surface 21 and from the edge 14b a sliding surface 22. The sliding surfaces in the exemplary embodiment are constructed as inclined planes. They abut at their upper ends, so that a crest 23 is formed thereat. The sliding surfaces extend from the outer cylindrical wall 8 toward the center body 10. As once can see from FIG. 2, the crests 23 lie slightly lower than the tip 10a of the center body 10.

The openings 11 to 18 enlarge in conveying direction Y, that is in the direction in which the loose material flows onto the conveyor trough 3.

The distributing container 2 is movably suspended such that it can pivot about an axis 24. Two bearing blocks 25 are provided to facilitate the movable suspension, which bearing blocks 25 are provided on the frame 26 of the machine. Control rods 27 are hinged to the bearing blocks 25, which control rods 27 are connected by control-rod holders 28 to the distributing container 2. Diametrically opposite the container fastening formed by means of the control rods 27, there is arranged a power-measuring device which is identified as a whole by the reference numeral 29. The power-measuring device has a power receiver 30 which in turn is secured to the frame 26 of the machine. A pressure plate 31 acts onto the power receiver 30, which pressure plate 31 is arranged on a console 32 which is secured to the distributing container 2.

The power receiver emits an electrical weight signal W which has a value that is proportional to the amount of loose material which is contained in the distributing container 2. The weight signal W is compared with a desired value S is an electronic regulating and control mechanism 33, which is symbolized only as a dot in the drawings. A difference signal R results from the comparison. Corresponding with the difference signal R action is applied to the drive motor (7) (servomotor).

A conveyor trough 3 is arranged underneath each one of the openings 11 to 18, so that each of the conveyor troughs can be fed with loose material from a specific opening.

OPERATION

The distributing device operates as follows. A specific level of the fill material is maintained in the distributing container 2 during the operation, for example a medium level of fill, as it is indicated by the dashed line 34. Small fill-level variations around this desired value are naturally unavoidable, however, are supposed to be kept as small as possible. The fill level is maintained constant with the help of the already described regulating mechanism. With a specific fill level corresponds, with a given product, a specific weight of the filled-in amount of loose material. If this weight is given, the signal W equals the signal S, so that the resulting signal R does not cause an operation of the conveyor member 5 or of the hinged plate 6'. If the fill level decreases, then the weight signal no longer corresponds with the desired value, and a difference signal R is created, which effects a movement of the servomotor 7 so that the conveying speed of the feed conveyor apparatus 5 is increased or that the plate 6' is opened. The weight of the amount of loose material increases now. When it is so high that the desired value S is exceeded, the further flow is throttled or even totally stopped.

The flow to the conveyor troughs 3 is determined by the fill level h and by the respective cross section of the opening which is associated with the trough. The openings can be of the same size or, however, also of different sizes corresponding with the goal to supply the various conveyor troughs with different amounts.

Figure 4:
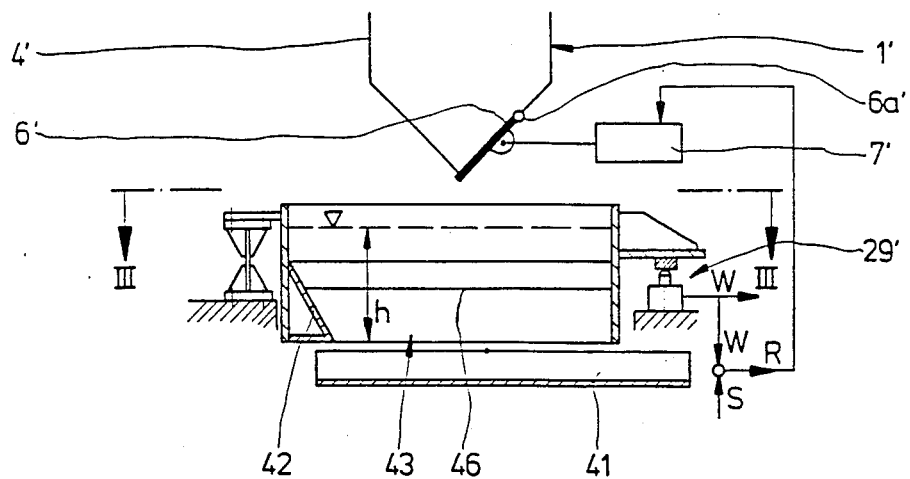
FIG. 4 is a vertical cross sectional view of the distributing device according to FIG. 3 corresponding with the line IV—IV of FIG. 3.
Figure 3:
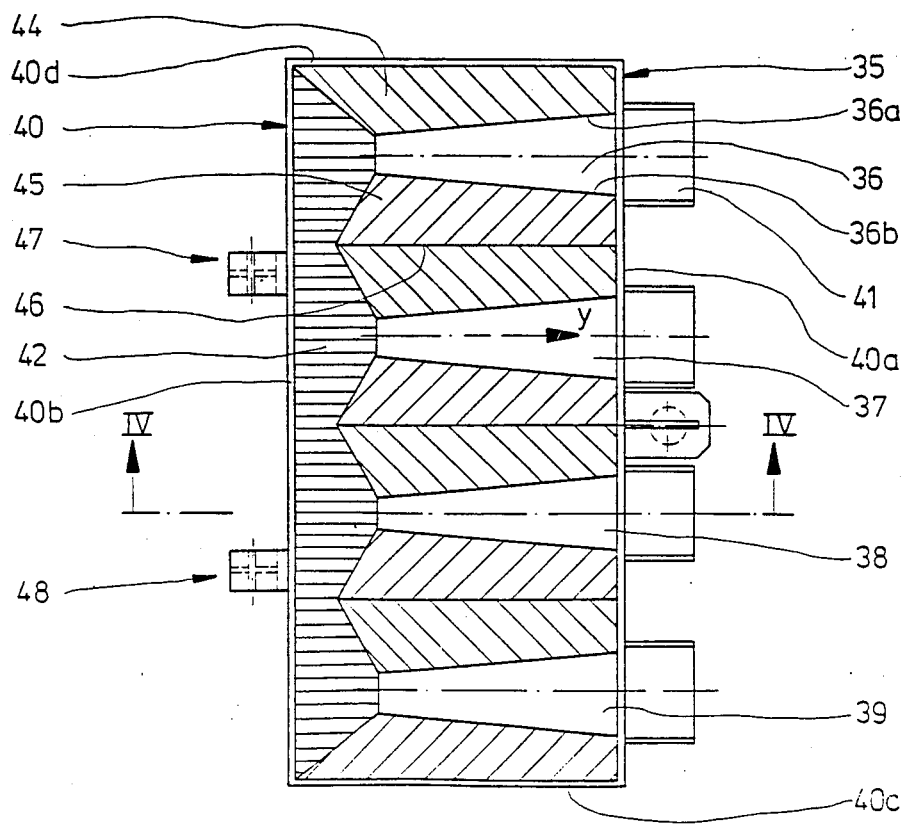
FIG. 3 is a top view of a rectilinearly constructed distributing device corresponding with the line III—III of FIG. 4.

While FIGS. 1 and 2 illustrates an embodiment, in which the distributing container is circular, FIGS. 3 and 4 show an embodiment with a rectangular distributing container 35. While according to FIGS. 1 and 2, the various openings at the base of the distributing container extend radially out from the center of the container, the openings 36 to 39 are parallel to one another and extend perpendicular to a long wall 40a of a rectangular edge 40 of the distributing container 35. The conveyor troughs 41 are correspondingly also arranged parallel to one another and not radially, as this is illustrated in FIG. 1. Furthermore, FIGS. 1 and 2 illustrated an embodiment which has a conveyor 5, the conveying speed of which can be adjusted steplessly, while FIG. 4 illustrates a feed device with an adjustable plate 6'.

An inclined sliding plane 42 out from a long edge wall 40b, which sliding plane drops off significantly toward the base 43 of the distributing container 35. Sliding surfaces 44, 45 start also in this embodiment out from the edges (for example 36a, 36b) of the openings, whereby the sliding surfaces, wnich are not adjacent to the short edge walls 40c, 40d, join at crests 46. In contrast to the embodiment according to FIGS. 1 and 2, the width of the sliding surfaces 44, 45 decreases in a conveying direction Y. This also results from the width of the openings 36 increasing in the conveying direction Y.

The loose material feed device has a container 4', which is constructed elongated, so that it extends, viewed in the top view, parallel to the long sides 40a, 40b of the edge 40 of the distributing container.

The distributing container 35 is suspended in the same fashion as the distributing container 2 according to FIGS. 1 and 2, namely by means of hinged suspensions which are identified as a whole by the reference numerals 47 and 48 and a power-measuring device 29'. The function is the same, as was described already in connection with FIGS. 1 and 2, so that a repeating is not needed.

The drawings show flat surfaces as sliding surfaces. However, curved surfaces are also conceivable. It is important that the sliding surfaces drop off all over toward the edges of the openings. surfaces are also conceivable. It is important that the sliding surfaces drop off all over toward the edges of the openings.

The embodiments of the invention in which an exclusive property or privlege is claimed are identified as follows:

1. In a distributing device for the distribution of loose material onto several conveyor means, in particular for a combination scale, comprising the improvement wherein a distributing container is provided having a base with openings, below each opening there is arranged a conveyor and a device to maintain constant the fill level (h) in the distributing container.

2. A distributing device according to claim 1, wherein upwardly diverging sliding surfaces extend from the edges of the openings.

3. A distributing device according to claim 1, wherein sliding surfaces from adjacent edges of adjacent openings join at a sharp-edged or rounded crest.

4. A distributing device according to claim 1, wherein the openings are enlarged, preferably linearly, in conveying direction (Y) of the conveyor.

5. A distributing device according to claim 1, wherein the device in order to maintain constant the fill level (h) has a scale and a feed mechanism for loose material, which feed mechanism can be operated in relation to its indicating device (W).

6. A distributing device according to claim 5, wherein the distributing container is supported on at least one power-measuring device, which emits an electrical weight signal, and wherein a regulator is provided, which compares the weight signal with a desired value and emits a resulting difference signal, by which the feed mechanism, for example the conveyor member of the feed mechanism or the hinged plate of the feed tunnel, can be controlled.

7. A distributing device according to claim 1, wherein the distributing container is circularly constructed and the openings extend radially, preferably are constructed approximately segment-shaped.

8. A distributing device according to claim 1, wherein the distributing container is constructed rectilinearly, viewed in the top preferably rectangularly, whereby the openings extend parallel to one another, viewed in the top view preferably at a right angle to one long side of the rectangle.

9. A distributing device according to claim 1, wherein the opening have different sizes.

* * * * *